INVENTORS
Bernhard Kaiser
Franz Strobel
Ortwin Wockock
by Michael J. Striker

United States Patent Office 3,391,772
Patented July 9, 1968

3,391,772
TIME VENDING MACHINE
Bernhard Kaiser, Villingen, Franz Strobel, Klengen, and Ortwin Wokock, Schwenningen, Germany, assignors to Kienzle Apparate G.m.b.H.
Filed Sept. 2, 1966, Ser. No. 576,950
Claims priority, application Germany, Sept. 3, 1965, K 57,035
20 Claims. (Cl. 194—84)

ABSTRACT OF THE DISCLOSURE

A time vending apparatus has a rotary control disk carrying at least one stop whose circumferential position represents a coin having a predetermined diameter, and whose adjustable radial position represents the time bought by the coin. Sensing means sense the position of the stop and set an indicator to represent the time during which a facility can be used after insertion of the coin.

---

The present invention relates to a time vending apparatus, such as a parking meter, which upon insertion of one or several coins, measures and indicates a certain time period during which some facility or space, in the case of parking meters, is available to the person inserting the coin. Time vending apparatus of this type has become popular for car washing apparatus, for washing machines, for parking space in garages, and similar purposes.

In known coin operated machines, the diameter of the inserted coin is sensed, and the time period of use determined and indicated accordingly. However, if a time vending apparatus is used for different purposes in accordance with the invention, the difficulty arises that the same time period is indicated and sold when a certain coin is inserted, although a higher price should be charged for the use of certain facilities for the same time period as for the use of another facility.

In accordance with the prior art, each time vending machine had to be specially constructed for the intended purpose and tariff so that by insertion of the same coin, different time periods were sold and indicated.

It is one object of the invention to overcome this disadvantage of known time vending apparatus, and to provide a time vending apparatus which can be preset to indicate and sell different time periods of use upon insertion of the same coin.

The time vending apparatus of the prior art requires a substantial constructive change of the sensing device by which the inserted coin is identified, and of the mechanism driving the indicator pointer, in order to adapt the apparatus to different coins of different diameters, which are substantially different in some countries. On the other hand, if a time vending device is exported to another country having a different coin system, the time vending machines had to be specially constructed to be able to handle the set of foreign coins which may have not only different diameters and thicknesses, but also different ratios of diameters between the coins of the respective set, as compared with the coins for which the apparatus was originally intended.

Since, in accordance with the present state of the art, a special vending machine has to be designed for each set of coins, and for different time periods sold upon insertion of the same coin, it is necessary to keep a great number of modified time vending machines in stock.

It is another object of the invention to provide a time vending apparatus which is adjustable to different rates and different coins.

Another object of the invention is to provide a time vending apparatus which can be adjusted and preset to respond to different sets of coins whose diameters or other dimensions are in different ratios.

It is also an object of the invention to provide a time vending apparatus which responds only to coins having a predetermined measure of a characteristic dimension, such as the diameter, and which is adjustable to indicate different time periods bought by the respective coin when the apparatus is used for different purposes.

With these objects in view, the present invention relates to a time vending apparatus which may be used as a parking meter but also for other purposes requiring the indication and vending of time upon insertion of coins.

One embodiment of the invention includes first control means actuated by each inserted coin to move from an initial position to positions representing a dimension of the coin, for example the diameter, so that the first control means assumes an accepting position only when a desirable coin having a predetermined diameter is inserted; second control means preferably adjustably mounted on the first control means for movement with the same to said positions and being in a sensing position when the first control means is in the accepting position, the second control means being settable to different preset positions representing different buying powers for buying different time periods selectively assigned to coins having the predetermined diameter; sensing means for sensing the selected and preset position of the second control means only in the sensing position of the same; indicator means for indicating time; and means operably connecting the sensing means with the indicator means so that the latter indicates the time period bought by the coin. This is due to the fact that the bought time period is represented by the selected preset and sensed position of the second control means. By setting the second control means to another present position before the apparatus is used, the apparatus can be adjusted to indicate a different time period bought by insertion of the same coin.

In the preferred embodiment of the invention, transporting means including a spring motor and a rotary transporting member receiving inserted coins are provided. The coins may have different diameters so that the first control means moves different distances to different accepting positions in which different second control means are located in the sensing position. The second control means are individually presettable to different preset positions representing different time periods assigned to the different coins. Consequently, different second control means are placed in the sensing position and are sensed by the sensing means when different coins are inserted.

In the preferred embodiment of the invention, the first control means include a turnable control member which carries at least one second control means adjustably in radial direction to a preselected preset position. When the turnable control member turns to the accepting position upon insertion of a proper coin, a stop is located in the path of a spring operated sensing member so that the same stops when abutting the adjusted and present stop. The distance which a sensing member moves between its normal position and the sensing position abutting the preset stop, is a measure of the time period bought by the respective coin, and the indicator means assume a corresponding indicating position.

In contrast to the prior art in which the position of a sensing member displaced by a coin according to its diameter, is used to control the indicator means to indicate a time period associated with the particular diameter, in the present invention the diameter of the coin is only used for determining the acceptance or rejection of the coin, while the indicated time periods depend on the presetting of the second control means, more particularly of adjustable stops.

The time vending apparatus according to the present invention achieves a result which cannot be obtained by corresponding apparatus according to the prior art inasmuch as the apparatus can be preset and adjusted to the use of any coin in accordance with any tariff or rate without requiring any constructive changes except the indicia of the indicator means.

Since the adjustment to different tariffs and different coins can be easily carried out, a standard time vending apparatus can be used for many different purposes, resulting in standardization and reducing of manufacturing and storage costs to a minimum.

Another object of the invention is to automatically register the monetary value of the inserted coins.

It is known to provide time vending apparatus with counters which register the number of insered coins. However, known apparatus of this type permits registration of not more than two different coins whose monetary values are in the ratio of 1:2. When the smaller coin is inserted, the counter turns only half a step, whereas the more valuable coin effects turning of the counter for a full step corresponding to a counting unit. Coins whose values are not in the ratio of 1:2, cannot be counted by the known counter arrangement, so that a precise control of the amount of money accumulated in the coin box of the apparatus is not possible. In some constructions of the prior art, the counter is operated whenever an inserted coin is sensed, so that even slugs without value are registered in the counter.

In accordance with the present invention, the coin counter is not operated under the control of a coin, but is driven by the sensing means, so that only real coins are registered independently of the diameter of the inserted coins since there is no fixed ratio between the differences in the diameters and the different buying power assigned to each coin by presetting the respective stop.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 11 is a front view, and FIG. 12 is an axial sectional view illustrating the drive means of the indicator means.

Figure 1:
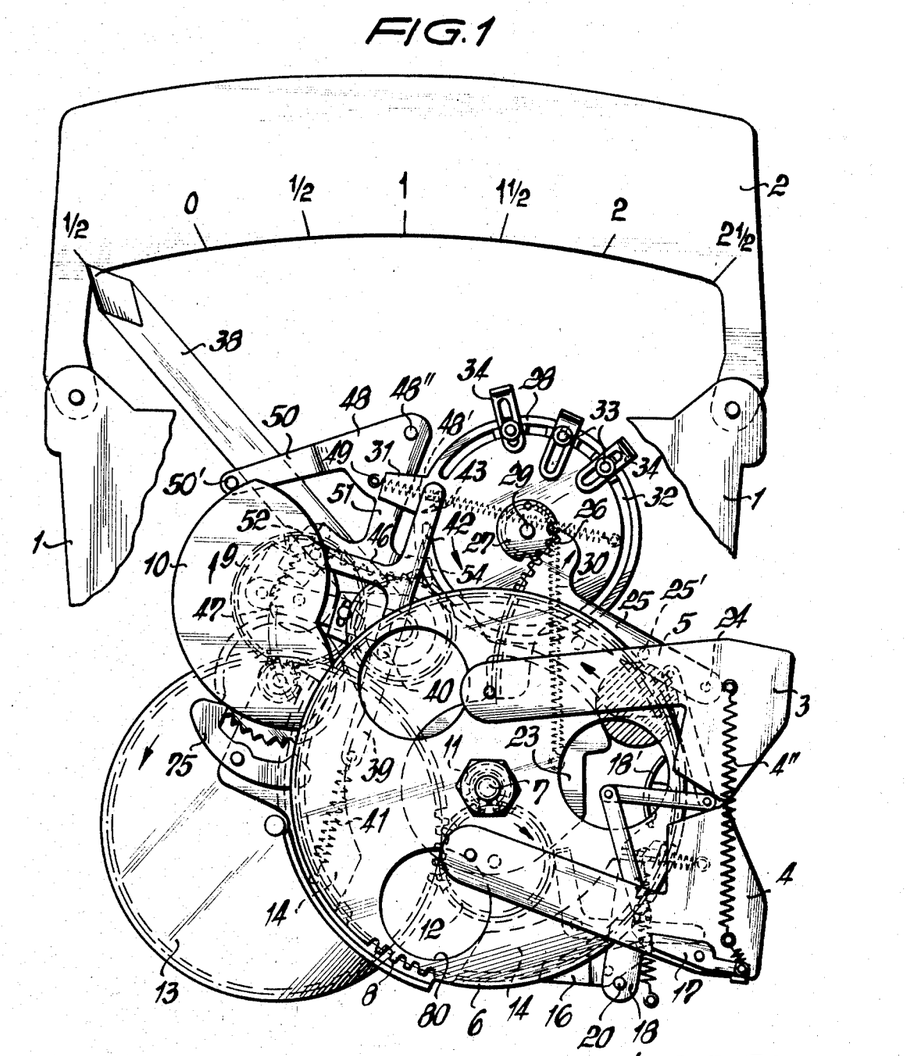
FIG. 1 is a fragmentary schematic front view illustrating an embodiment of the invention without housing and supporting frame.

Referring now to the drawings, FIG. 1 shows all parts of the apparatus superimposed. The several shafts are mounted on three vertical support plates, of which only one plate 1 is partly shown in FIG. 1 and fully shown in FIGS. 2 and 10. Support plate 1 also carries the dial 2 of the indicator means which include a pointer 38. A pair of levers 3 and 4 is mounted on a support plate and connected by a spring 4″ so that the jaws 3′ and 4′ engage each other. A linkage system connects levers 3 and 4 so that the same move uniformly apart when a coin 5 is inserted between the same. The rear faces of the jaws 3′, 4′ are slanted so that the inserted coin is guided and urged into a corresponding slot of a transporting disk 6 which is mounted on a shaft 7 and has a peripheral gear 8, see FIG. 2, meshing with a gear 9 secured to a cam 10. The transmission ratio between gears 8 and 9 is 1:3 so that cam 10 performs three revolutions for one revolution of the transporting disk 6.

Figure 2:
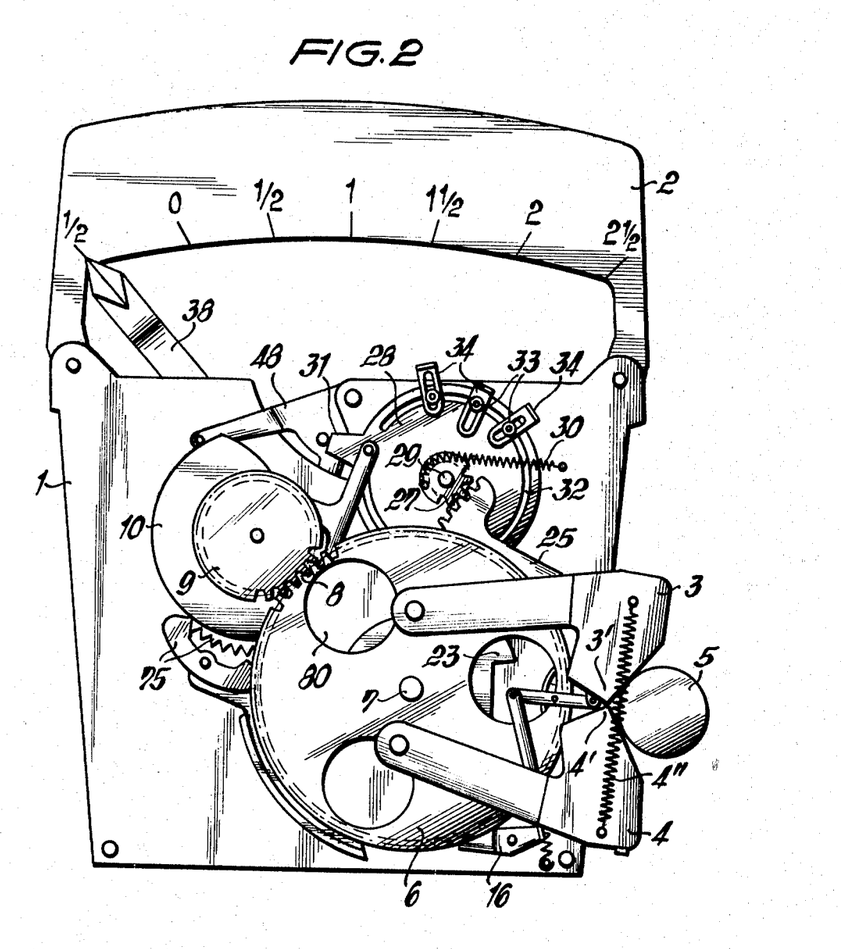
FIG. 2 is a front view corresponding to FIG. 1, but illustrating only part of the mechanism, particularly the transporting means receiving an inserted coin.
Figure 3:
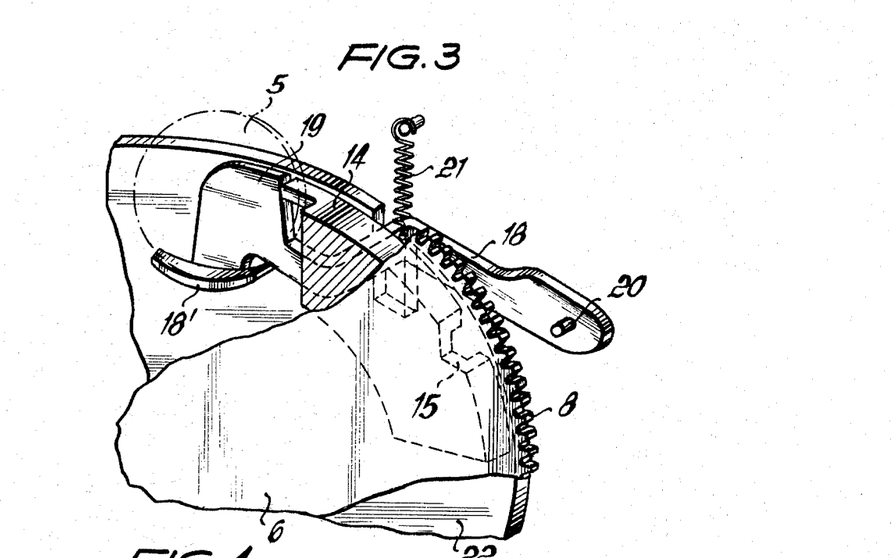
FIG. 3 is a fragmentary perspective view illustrating locking means for locking the transporting means in the normal position of rest of the apparatus.
Figure 4:
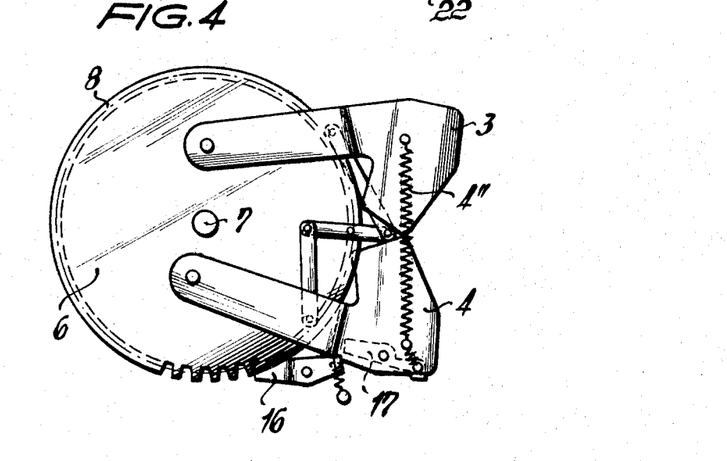
FIG. 4 is a fragmentary front view illustrating other locking means for locking the transporting means.
Figures 5, 6:
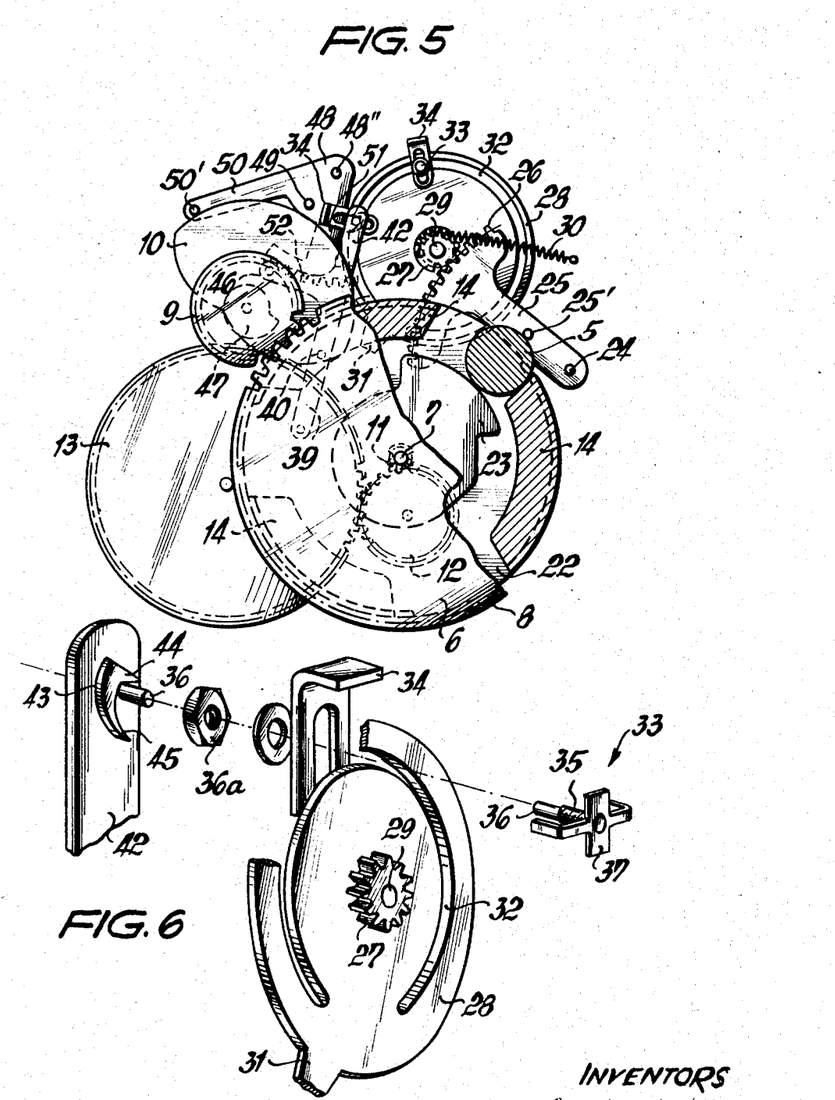
FIG. 5 is a fragmentary front view, partially in section, illustrating details of the transporting and sensing means of the apparatus.
FIG. 6 is a fragmentary perspective exploded view illustrating control means for presetting the apparatus to indicate different time periods upon insertion of the same coin.

Transporting disk 6 is fixed on shaft 7 which carries a small pinion 11, see FIG. 5, meshing with a gear 12 driven by a peripheral gear of a spring motor 13 so that the transporting disk 6 is urged to turn in counterclockwise direction. Transporting disk 6 has on its rear face, three segment-shaped projections 14, best seen in FIGS. 3 and 5, each of which has an arresting recess 15 cooperating with a spring loaded pawl 16, see FIGS. 1, 2 and 4. Arresting recess 15 is best seen in FIG. 3.

In the normal position of rest of the apparatus, the transporting disk 6 is urged by spring motor 13 to turn, but such turning movement is prevented by arresting pawl 16 engaging an arresting recess 15 of one of the three segment-shaped projections 14. Upon insertion of a coin 5, a spring loaded pawl 17 on lever 4 passes arresting pawl 16 while resiliently yielding, but when the levers 3, 4 return to the closed position after the coin is placed in the transporting disk 6, the return movement of lever 4 causes engagement between pawl 17 and pawl 16 so that the latter is turned and releases transporting disk 6 for movement with the coin 5. When disk 6 has turned an angle of 120 degrees, recess 15 in the next following segment-shaped projection 14 is engaged by arresting pawl 16 so that the transporting disk 6 is stopped again.

However, the turning movement of transporting disk 6 cannot start upon release by pawl 16, unless coin 5 is fully inserted. As best seen in FIG. 3, a locking lever 18 is mounted for turning movement about a pivot 20 and is urged by a spring 21 to move outward in relation to transporting disk 6 and to a normal position in which its projection 19 is engaged by a segment-shaped projection 14 of transporting disk 6 so that the same cannot turn until a fully inserted coin 5 is held by the jaws 3′, 4′ in a position engaging a curved abutment 18′ on lever 18 and urging the same to turn in counterclockwise direction as viewed in FIG. 3 to a position in which the locking shoulder 19 releases segment-shaped projection 14, permitting transporting disk 6 to turn due to the action of spring motor 13.

Transporting member 6, 14 is mounted on a guide plate 22, see FIG. 5 which carries a stationary guide member 23 along which coin 5 moves during part of the angular movement of transporting member 6, 14 through an angle of 120 degrees. As best seen in FIG. 5, the opposite ends of segment-shaped projections 14 form passages for coins 5 which can be inserted in three angular positions of transport member 6, 14 in which the respective passages are located opposite the inserting means 3, 4. The inserted coin engages abutment 18′, releases transporting member 6, 14 for movement in counterclockwise direction, so that it separates from abutment 18′, whereupon the coin passes onto the curved guide face of guide member 23, as shown in FIGS. 5 and 1 in which the coin in this position is hatched. As long as the coin moves along the curved guide face, it projects exactly the same distance from the periphery of the circular transporting member 6, 14, as best seen in FIG. 5. Transporting member 6, 14 has a circular cover plate provided with three circular windows 18 consisting of a transparent material permitting the inspection of an inserted coin, as is apparent from FIG. 2.

While the coin is being transported, first control means are operated by the coin to assume a position representing its diameter. A feeler lever 25 is mounted on a pivot 24 and has a gear segment 26 concentric with pivot 24. A feeler pin 25' is secured to lever 25 and is positioned to cooperate with a coin 5 transported by transporting member 6, 14 along the curved guide face of guide member 23. Gear segment 26 meshes with a pinion 27 secured to a circular control disk 28 which is mounted for free turning movement on a shaft 29. A spring 30 is secured to control disk 28 and to a fixed point on the frame, and urges pinion 27 and control disk 28 to turn in clockwise direction, so that segment 26 with feeler lever 25 is turned in counterclockwise direction into abutment with a fixed stop, not shown, in the position of rest of the apparatus. However, when a coin is moved past feeler pin 25', lever 25 is turned clockwise against the action of spring 30, and rotates pinion 27 and control disk 28 an angle depending on the diameter of coin 5 since the distance which coin 5 projects beyond the periphery of transporting member 6, 14 is exactly determined by the guide member 23. Control disk 28 is circular, but has a projection 31 which is in the normal position of rest of the apparatus in the position shown in FIG. 2 aligned with a pin 49 on a sensing member 48 which is spring-biased in counterclockwise direction so that turning movement of sensing member 48 is prevented by stop projection 31 in the normal position of rest shown in FIG. 2.

Control disk 28 has a circular slot, interrupted in the region of stop projection 31 as best seen in FIG. 6, for supporting second control means in the form of stops 34. Attaching means 33 for adjustably attaching stops 34 to control disk 28 include a threaded pin 35 having a finger 36 and a cross shaped head 37 whose lateral arms fit into the curved slot 32, while its main portion crosses the slot. Each stop 34 has a slot through which threaded pin 35 passes so that the respective stop 34 can be clamped to control disk 28 by a nut 36a and a washer.

While the nut is loose, pin 35 and the respective stop 34 can be moved along the circular slot 32 so that each stop 34 can be placed in an accurately selected position along the circumference of disk 28. The radial slot of stop 34 permits its adjustment in radial direction before nut 36a is tightened. In other words the angular position of each stop on control disk 28, and the radial distance which each stop 34 is spaced from the axis of control disk 28, can be preset by a simple operation.

The circumferential position, and the angular distance which each stop 34 is spaced from projection 31, depend on the dimensions of a respective associated coin, and more particularly on the diameter of the coin. Each stop 34 is associated with a different coin so that the three stops 34 shown in FIG. 2 are associated with three different coins having different diameters and different monetary values.

As will be explained hereinafter in greater detail, the circumferential position of each stop 34 represents the diameter of the respective coin, and the radial distance which each stop projects beyond the periphery of control disk 28, represents the monetary value of the respective coin. Consequently, a coin having a certain diameter will be represented by a stop 34, but the buying power of the respective coin is determined by radial adjustment of the respective stop 34. In accordance with the buying power ascribed to a coin having a particular diameter, a certain time period of use is sold by the apparatus and indicated by the position of pointer 38.

Testing means are provided to determine whether the inserted coin is real and has exactly the right diameter, or whether a slug has been used whose diameter is not quite accurate. The testing means include a holding lever 39, see also FIGS. 7, 8 and 9, mounted on a pivot 40 for angular movement and held by two oppositely acting spring in a normal position shown in FIGS. 5 and 7, and has a holding claw 43 with two fingers 44 and 45 best seen in FIG. 6. In the normal position of holding lever 39, holding claw 43 is located in the region of slot 32 of control disk 28 and in the path of movement of pins 35 of stops 34.

When a coin 5 is transported to the position shown in FIG. 5, it engages feeler pin 25', displaces lever 25 and segment 26, and turns pinion 27 and control disk 28 with stops 34. The respective stop 34 associated with a coin of a particular diameter was previously set in the circular slot 32 in such an angular position that pin 36 of the respective stop 34 is exactly located between the fingers 44 and 45 of claw 43 when a coin having precisely the right diameter was inserted. Pin 35 slightly displaces holding lever 39 to enter the recess between fingers 44 and 45, finger 44 having a suitable outer guide face for this purpose. This position is assumed when feeler pin 25' is on the highest radial point of coin 5, and during further travel of the coin with transporting member 6, 14, spring 30 will urge control disk 28 with stops 34 to turn in clockwise direction, but such turning movement is prevented since claw 43 has such a shape as to be able to hold pin 35 and to prevent turning of control disk 28.

However, if the inserted coin does not have the correct diameter, feeler pin 25' will displace lever 25 and thereby control disk 28 different angles so that pin 35 will not be engaged by claw 43, and spring 30 will be able to turn control disk 28 back to its initial position, as will be explained hereinafter in greater detail with reference to FIGS. 8 and 9.

Assuming that a real coin was inserted and that the control means 25', 25, 27, 28, 35 are in a position in which pin 35 is held by holding means 39, 43, which indicates acceptance of the coin so that this position may be turned an accepting position, the radial distance which the respective stop 34 projects from disk 28, and which represents the buying power selectively ascribed to a coin having a certain diameter, must now be sensed.

The sensing means comprise an angular lever 48 having a sensing pin 49 which in the initial position of rest of the apparatus is located opposite projection 31 of control disk 28, as shown in FIG. 2. In the accepting position shown in FIG. 5, stop 34 is located opposite pin 49. An arm 50 of sensing lever 48 has a follower pin 50' engaging the peripheral cam face of a rotary cam 10. Cam 10 is connected by gear 9 to the gear ring 8 of transporting disk 6 and performs three revolutions for each revolution of transporting disk 6. A small cam 47 is mounted on cam 10 and cooperates with a follower arm 46 of holding lever 39 for the purpose of releasing holding pin 35 from claw 43 of holding lever 39 after the radial position of the present stop 34 has been sensed by sensing means 48, 49.

Figures 11, 12:
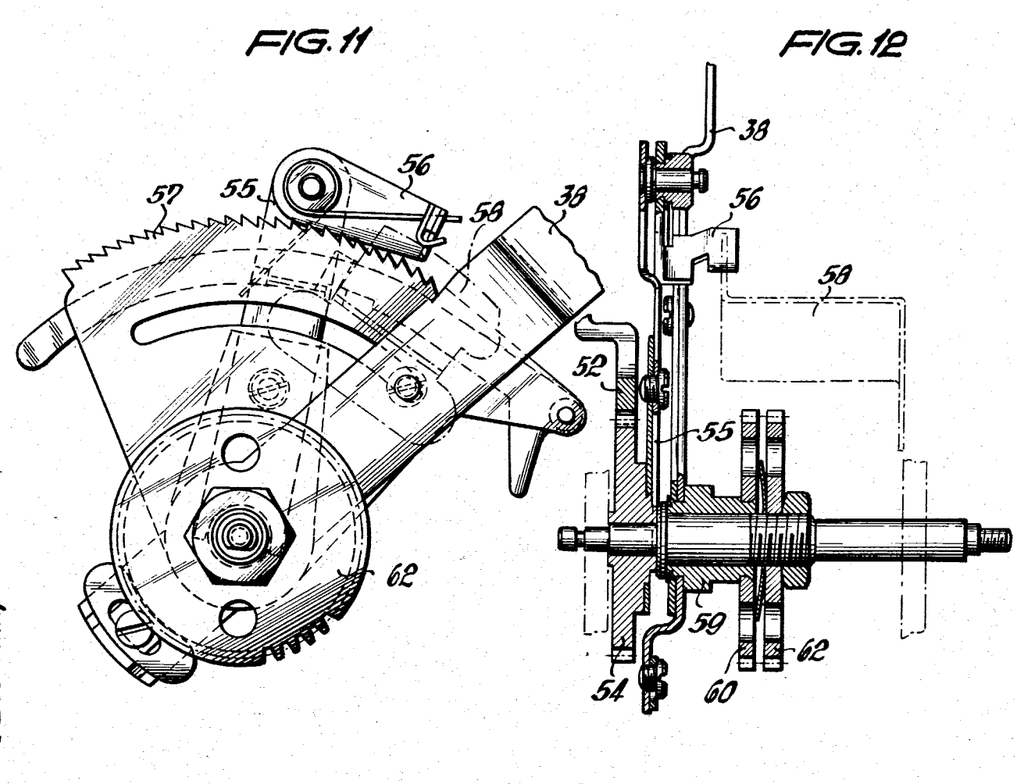

Arm 51 of sensing lever 48 has a gear segment portion 52 meshing with a gear 54, as best seen in FIG. 12. Gear 54 carries an arm 55 with a spring biased pawl 56 cooperating with a ratchet segment 57 to turn the same together with a cam 58 which acts on the pointer 38 of indicator means 2, see also FIG. 11. Consequently, when sensing means 48, 49 is permitted by the position of cam 10 to move into a position in which pin 49 abuts the stop 34 held by holding means 39, 43 in the position of FIG. 5, pointer 38 is turned a corresponding angle to indicate on the dial a time period corresponding to the buying power ascribed to the respective coin by presetting the respective stop 34 to a particular radial position.

Figure 10:
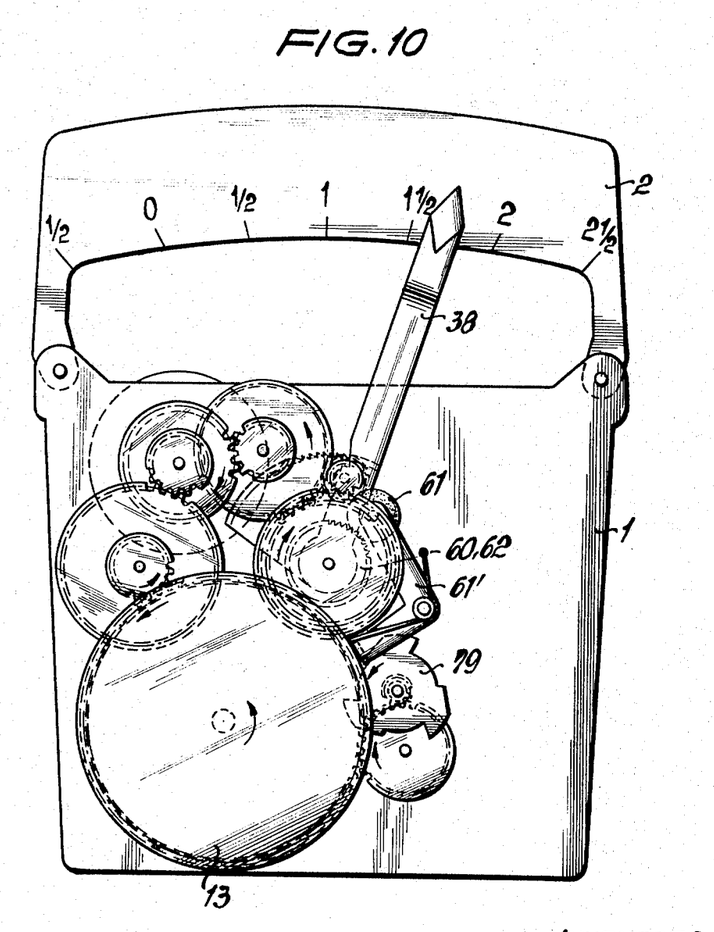
FIG. 10 is a fragmentary schematic front view illustrating drive means for returning the indicator means during the indicated time period to a position of rest.

Pointer 38 is secured to a bushing 59 carrying a gear 60 having pointed teeth and being driven through a rubber roller 61 which is resiliently urged against gear 60 by another gear 62 driven by a gear train shown in FIG. 10 from the spring motor 13. Rubber roller 61 is mounted on a cam follower 61' controlled by a cam 79 having three projections and being driven by gears from clockwork 13. When rubber roller 61 is held by cam 79 in a position spaced from gear 60, pointer 38 can be turned under the control of sensing lever 48 to a position indicating the sold time period, but when this is accomplished, cam 79 permits engagement of gear 60 by rubber roller 61 so that the pointer is driven by the clockworks 13 in opposite direction at a constant speed until it arrives at the beginning of the dial and indicates that the time period bought by a particular coin has expired. The indicator mechanism of FIGS. 11 and 12 is known, but its control by the sensing lever 48 is an object of the present invention.

Figure 13:
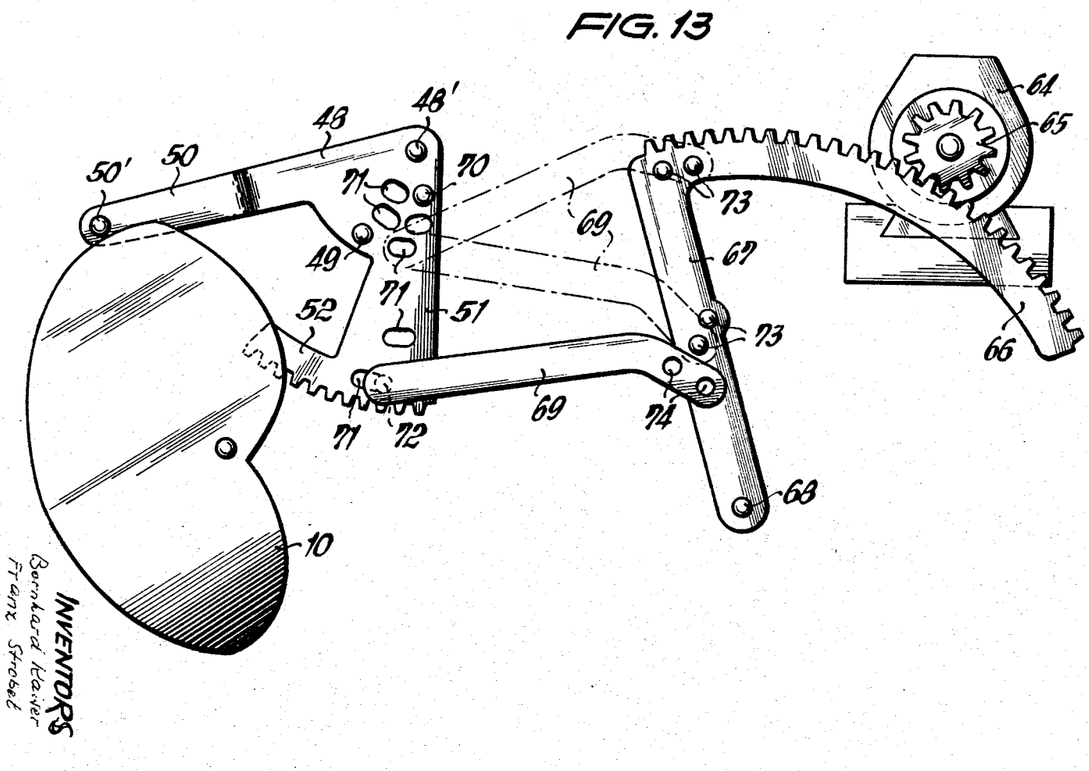
FIG. 13 is a fragmentary front view illustrating a transmission between the sensing means which determine the time period bought by a specific coin with a counter or totalizer for registering the sold time and thereby the total value of the inserted coins.

As shown in FIG. 13, a counter or totalizer 64 is provided which has a unit wheel connected by a pawl and ratchet drive, or by a one-way roller clutch, with a gear 65 so that gear 65 can drive counter 64 only in one direction.

A gear segment 66 meshes with gear 65 and is part of a lever 67 mounted for turning movement about a pivot 68.

A detachable link 69 is provided for connecting lever 67 with the angular sensing lever 48. Arm 51 has a plurality of bores 70 and slots 71 into which a pin 72 on link 69 can be selectively inserted. Lever 67 has a plurality of spaced studs 73 which can be placed in either of two bores 74 at the other end of link 69. FIG. 13 shows one position of link 69 obtaining a particular transmission ratio between sensing lever 48 and gear 65. If link 69 is placed in another position, for example as shown for two positions in dash-and-dot lines, the transmission ratio will be changed. As noted above, sensing lever 48 turns an angular distance depending on the radially adjusted position of a sensed stop 34, representing the buying power and the bought time period of the respective coin.

When sensing lever 48 turns the respective angular distance, counter 64 will be operated by the transmission 65 to 74 whose ratio can be changed so that the counter indicates the momentary value of the inserted coin.

*Operation*

A coin 5 having a predetermined diameter is inserted between the jaws 3 and 4 which move apart and then again toward each other when the coin has passed the points 3', 4'. As shown in FIGS. 2 and 4, pawl 17 engages arresting pawl 16 during the opening of jaws 3 and 4 but yields resiliently. During the following closing of the jaws, pawl 17, engaging arresting pawl 16, is blocked so that the movement of jaw 4 causes arresting pawl 16 to release arresting recess 15, of one of the three segment-shaped projection 14, see FIG. 3.

Recess 15 is arranged in such a circumferential position that there is still a small gap between shoulder 19 and a corresponding stop portion of the respective segment-shaped projection 14 as long as pawl 16 engages recess 15. Upon release of recess 15 by pawl 16, spring motor 13 turns transporting member 6, 14 through gears 12, 7, see FIGS. 1 and 5, until the stop projection of segment 14 abuts shoulder 19 of lever 18 in the position in FIG. 3.

Spring 4" urges jaws 3 and 4 toward each other so that the slanted rear faces of the jaws urge coin 5 inward from the position shown in FIG. 3 resting on an abutment 18' of lever 18, to a radially inner position in which shoulder 19 is withdrawn from segment 14 while lever 18 turns in counterclockwise direction against the action of spring 21. Upon release of the stop projection of segment 14, transporting member 6, 14 continues its turning movement in counterclockwise direction under the action of the spring motor 13, and coin 5 immediately engages the lower end of the curved guide face of guide member 23, best seen in FIG. 5. An escapement mechanism 75, see FIGS. 1 and 2, retards the rotation of transporting member 6, 14. While the coin is being inserted and displaces abutment 18', it is visible in a window 80 which is located in the region of abutment 18' of lever 18 and of the lower end of the curved guide face of member 23, as best seen in FIG. 2.

Guide member 23 is so positioned that a segment of coin 5 projects beyond the periphery of transporting member 6, 14. During rotation of the transporting member, the projecting segment of the coin engages pin 25' which travels along the periphery of the coin to the position shown in FIG. 5, corresponding to the greatest angular displacement of feeler lever 25 in a clockwise direction, and then travels downwardly along the periphery of the coin.

Feeler lever 25 is displaced an angular distance corresponding to the diameter of the coin. If the coin has the correct diameter, within small tolerances, feeler lever 25 is displaced a certain angle representing the diameter of the coin, and through gears 26, 27, control disk 28 is turned a corresponding, but greater angle also representing the diameter of the coin.

When the control means 25, 26, 28 are turned by the coin, a previously set stop 34 will be turned to a position located exactly opposite sensing pin 5, as best seen in FIG. 5. The position of stop 35 corresponding to the respective coin having a given diameter is preset by moving pin 35 in the circular slot 32. A coin having a substantially different diameter will not cause turning of disk 28 to a position in which the respective stop 34 is located opposite sensing pin 49 in a sensing position.

Assuming that a real and desirable coin having the given diameter has been inserted, and that the first control means 25 to 28, 35, 36 have assumed an angular position representing acceptance of the respective coin, pin 36 will move into the mouth between fingers 44, 45 or claw 43. Since claw 43 and holding lever 39 hold pin 36 and control disk 28 against movement in clockwise direction as viewed in FIG. 5, spring 30 cannot turn control disk 28 with pin 35, 36 back to the initial position.

However, if the inserted coin was a slug, or has a wrong diameter, pin 35, 36 will be in a different angular position and will not stop in the mouth of claw 43.

Figures 7, 8, 9:
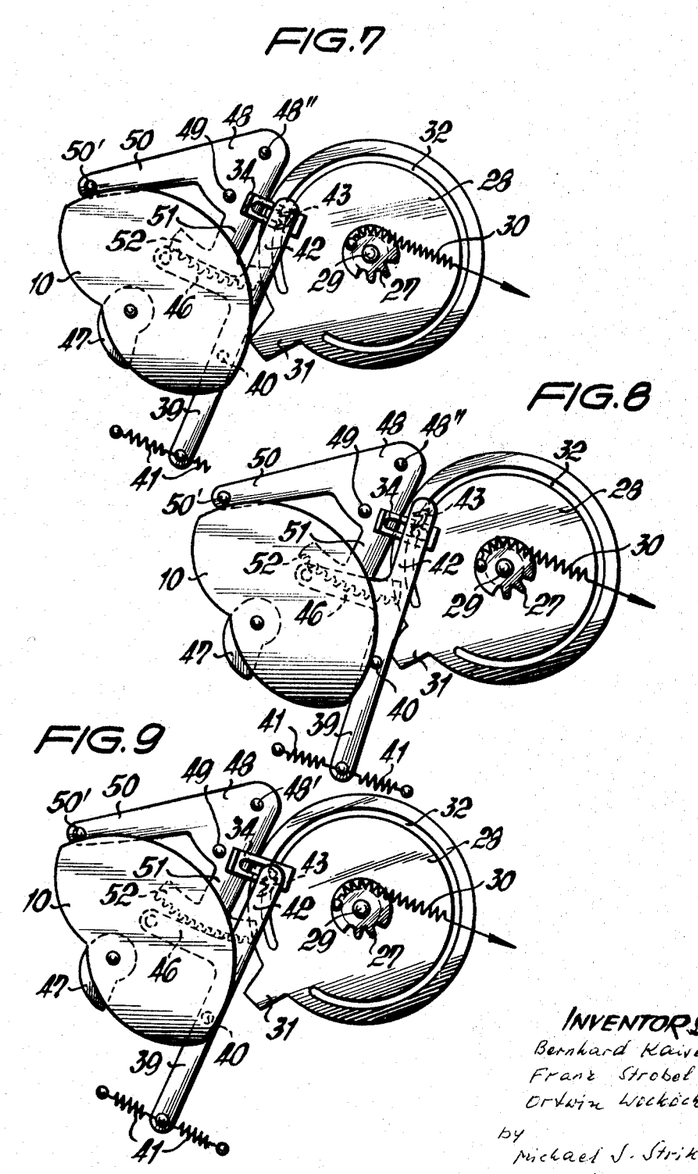
FIGS. 7, 8 and 9 are fragmentary front views illustrating different operational positions of the sensing means and adjustable control means of the apparatus.

Assuming that the axial diameter of the coin is greater than the diameter of a desirable coin, pins 35, 36 will move to the position shown in FIG. 8 beyond claw 43, which yields together with lever 39. Since pin 36 is not held by the claw, it acts on an outer lateral face of finger 45 under the action of spring 30 to push lever 39 aside so that lever 39 yields and pin 36 can pass claw 43 while control disk 28 turns to its initial position, preventing any sensing of a stop 34 by the sensing means 48, 49.

Assuming that the diameter of the inserted coin or slug is too small, pin 36 does not reach claw 43 at all, but control disk 28 stops in the position of FIG. 9. Since holding means 39, 43 does not hold pin 36 in this position, control disk 28 turns back in clockwise direction to its initial position preventing any sensing of respective stop 34.

The angular spacing between fingers 44 and 45 represents the tolerance within which a coin is accepted.

Assuming that a desirable real coin having the correct diameter has been inserted, and that the first control means 25 to 28, 36 are in an "accepting" position held by holding means 39, 43 so that the second control means 34 is located opposite sensing pin 49, the continued rotation of transporting member 6, 14 effects turning of cam 10 with smaller cam 47 in clockwise direction. In the initial position of rest of the apparatus, cam 10 and follower pin 50' of sensing means 48 are in the position of FIG. 1. In the accepting position of FIG. 7, cam 10, which turns three times as fast as transporting member 6, 14, is in a position in which the follower pin 50' is located close to the highest point of the cam. Thereupon, cam 10 turns further to a position in which a descending cam portion engages follower pin 50' so that sensing pin 49 moves toward and into abutment with the stop 34. A spring 48', see FIG. 1, urges sensing lever 48 to turn in counterclockwise position so that follower pin 50' engages cam 10 permitting sensing pin 49 to move toward stop 34.

As explained above, the angular distance which sensing means 48, 49 moves until abutting stop 34, depends on the radial position of stop 34, which was previously adjusted and preset in accordance with the buying power ascribed to the respective coin having a particular diameter.

The angular sensing movement of sensing means 48, 49 is transmitted by gear segment 52 on arm 51 to gear 54 and the transmission described with reference to FIGS. 11 and 12 so that the pointer 38 is displaced an angular distance which is proportionate to the angular distance of the movement of the sensing means. Since this angular distance depends on the preset radial position of stop 34, it can also be said that the radial position of stop 34 not only represents the buying power, but also the time period bought by the respective coins having a given diameter.

Several adjustable stops 34 are shown in FIGS. 1, 2 and 5, and it will be appreciated that each stop is associated with a coin having a different diameter. Due to the fact that the stops 34 are circumferentially spaced, they will be placed in the accepting position opposite sensing pin 49 only if an associated coin having a particular diameter is inserted. For example, referring to FIG. 5, a coin having a greater diameter than the illustrated coin 5, will cause turning of control disk 28 through a greater angle than the illustrated coin 5, so that not the first stop 34, but the second stop 34 will be located opposite sensing pin 49. The selection which stop 34 corresponding to a particular coin is sensed, is completely independent of the value of the coin. Each stop is set to radially project a different distance representing the buying power and also the time bought for a coin having this value. A coin having a larger diameter may be associated with a buying power and bought time smaller than the buying power and bought time of a coin having a smaller diameter since the smaller coin may consist of silver and the larger coin of nickel. Even assuming coins of the same diameter, the respective stop can be adjusted in radial direction so that the respective coin buys longer or shorter time periods, which is necessary if the price of the sold time period is to be increased. Also, when the time vending machine is used in a foreign country a coin having the same diameter as the coin for which the apparatus was originally intended, may have an entirely different value to which the apparatus can be set by simple radial adjustment of the respective stop 34.

During the above described operation, rubber roller 61 is held by cam follower 61' by the action of a projecting portion of cam 79 out of engagement with gear 60 so that pointer 38 can be freely turned to the position indicating the bought time. When the pointer has arrived in this position, cam 79 operates cam follower 61' to place rubber roller 61 in a position engaging gears 60 and 62, see FIGS. 10 and 12. Since gear 62 is driven by clockworks 13, rotary motion is transmitted by gear 62 to rubber roller 61 and by the same to gear 60, sleeve 49 and pointer 38 so that pointer 38 moves back to the zero position on the dial at a constant speed determined by the spring motor 13. The time required for the running down of the apparatus, of course depends on the angular position of pointer 38 obtained by insertion of a particular coin.

While transporting members 6, 14 continues its turning movement, cam 10 acts on cam follower pin 50' to turn sensing lever 48 back to its initial position. The reversed movement of sensing lever 48 with gear segment 52, has no influence on the pointer 38, since the ratchet pawl 56 drives ratchet segment 57 only in one direction, and slides on the ratchet segment in the opposite direction. During this rotation of cam 10, cam 47 on the same engages follower arm 46 of holding lever 39 so that the same turns about pivot 40 and arm 42 thereof with claw 43 is angularly displaced to release pin 36, permitting spring 30 to turn control disk 28 with stops 34 in clockwise direction to the initial position shown in FIG. 1. In this position, sensing pin 49 rests on projection 31 under the action of spring 48' so that cam 10 becomes effective to cooperate with follower pin 50' only after transporting member 6, 14 has turned out of its initial position of rest together with projection 31.

During this cycle, transporting disk 6 has turned 120 degrees, and cams 10 and 47 have turned 360 degrees, and coin 5 has dropped between segments 14 into a box, not shown.

While sensing pin 49 moves toward the respective stop 34, its angular movement is transmitted through a suitably set link 69 to the gear segment 66 which rotates gear 65 and thereby the counterwheels of counter 64 in one direction. The transmission ratio is determined by selecting a position of link 69.

A totalizer or counter 64 does not count the coins, but totals the movements of sensing means 48, which represent the time bought by inserted coins. Since the bought time is in a certain given ratio to the buying power and monetary value of the coin, the values registered in the totalizer represent not only sold time periods, but also the value of the inserted coins.

The totalizer is only operated if time was actually bought by a real and accepted coin which caused a movement of pointer 38. Since the angular position of the indicator pointer does not depend on the diameter of the coin, but on the buying power of the coin, the angular movement of the sensing means 48 and of the pointer and totalizer are proportioal to the monetary value of the coin, and entirely independent of the diameter of the coin.

While in accordance with the prior art the number of coins having a given diameter was counted, which may cause counting of slugs, the arrangement of the present invention totalizes the monetary values of the coins which have bought time, irrespective of the diameter of the coins.

It will be understood that each of the elements described above, or two or more together, may also find a useful application in other types of time vending apparatus differing from the types described above.

While the invention has been illustrated and described as embodied in a time vending appaartus having presettable control means for assigning different buying power and bought time periods to coins having the same dimensions, it is not intended to be limited to the details shown, since various modifications and structural changes may be made without departing in anyway from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Time vending apparatus comprising, in combination, transporting means for inserted coins; drive means for moving said transporting means with at least one inserted coin, first control means actuated by each inserted coin moving with said transporting means to move from an initial position to positions representing a dimension of the coin, and including an accepting position representing the predetermined measure of said dimension of a desirable coin; second control means mounted on said first control means for movement with the same to said positions and being in a sensing position when said first control means is in said accepting position, said second control means being mounted on said first control means settable to different preset positions representing different buying powers for buying different time periods selectively assigned to coins havoing said predetermined measure of said dimension; sensing means movable for sensing the selected and preset position of said second control means only in said sensing position of the same; indicator means for indicating time; and means operably connecting said sensing means with said indicator means so that the latter is automatically moved and set in accordance with the distance of the movement of said sensing means to said second control means in said selected and preset position to indicate the time period bought by a coin and represented by the selected preset and sensed position of said second control means whereby different time periods selected by setting said second control means to different preset positions can be bought by the same coin.

2. Time vending apparatus according to claim 1 wherein said first control means include a control member turnably between said positions; wherein said second control means include at least one stop mounted on said first control means adjustable in circumferential direction in accordance with said measure of said dimension of a coin, and adjustable in radial direction to a selected preset position; and wherein said sensing means is movable along a path in which said stop is located in said sensing position.

3. Time vending apparatus according to claim 1 and including holding means for holding said first control means in said accepting position and said second control means in said sensing position; and spring means for returning said first control means to an initial position of rest when said first control means is moved by an inserted undesirable coin to a position different from said accepting position.

4. Time vending apparatus according to claim 3 wherein said first control means includes a turnable control disk having a stop projection and carrying said second control means; said stop projection blocking movement of said sensing means in the initial position of rest of said control disk and transporting means.

5. Time vending apparatus according to claim 3 wherein said holding means includes a holding lever, spring means for positioning said holding lever in a normal position, and a holding claw having two fingers and secured to said holding lever; and wherein said first control means includes a projecting pin engaged by said claw only in said accepting position of said first control means.

6. Time vending apparatus according to claim 5 including means for automatically returning said first control means to an initial position of rest so that said first holding means return to said initial position of rest when not engaged by said claw.

7. Time vending apparatus according to claim 6 wherein said drive means rotate said transporting means; and including a cam rotated by said drive means and being operatively connected with said sensing means for causing a sensing operation while said holding means hold said first control means in said accepting position and said second control means in said sensing position; said holding means being operatively connected with said cam so that said pin of said first control means is released by said claw after the preset position of said second control means has been sensed by said sensing means whereby said first control means are permitted to return to the initial position of rest thereof.

8. Time vending apparatus according to claim 1 wherein said first control means include a control member turnable between said positions; wherein said second control means include at least one stop mounted on said first control means adjustably in circumferential direction in accordance with said measure of said dimension of a coin, and adjustably in radial direction to a selected preset position; and wherein said sensing means include a sensing member movable along a path in which said stop is located in said sensing position, biasing means urging said sensing member to move to a sensing position abutting said stop in said sensing position, and a cam controlling movement of said sensing member away from said stop; wherein said sensing member is operatively connected with said indicator means so that the latter moves a distance depending on the distance moved by said sensing member into said sensing position abutting said stop.

9. Time vending apparatus according to claim 8 wherein said sensing member is an angular double-armed lever having one arm cooperating with said cam and controlled by the same so that it moves under the action of said spring into said sensing position while moving said indicator means, and is held otherwise by said cam in an inoperative position.

10. Time vending apparatus according to claim 9 and including holding means for tmeporarily holding said first control means only if the same assumes said accepting postiion; and including another cam mounted on said cam and operating said holding means to release said first control means when the sensing operation has been completed under the control of said first mentioned cam; and including means for returning said first control means to an initial position of rest when released by said holding means.

11. Time vending apparatus according to claim 1 wherein said transporting means are adapted to receive different coins having different measures of said dimension; including a plurality of said second control means respectively associated with different coins and being respectively presettable to different preset positions representing different time periods assigned to said different coins; and wherein said first control means is moved to different accepting positions by different inserted coins so that different second control means are placed in said sensing position and are sensed by said sensing means whereby different time periods are bought by different coins, and indicated.

12. Time vending apparatus according to claim 11 wherein said first control means includes a control disk having a part-circular slot; and wherein each of said second control means include a stop, and means for mounting said stops in angularly spaced positions respectively corresponding to different diameters of acceptable different coins, said stops being individually adjustable in radial direction to represent different time periods assigned to coins having different diameters whereby by circumferential adjustment of said stops, each stop is placed in said sensing position when said turnable control disk is turned by a different coin to a different accepting position, and whereby said sensing means senses differently preset stops in said sensing position and controls said indicator means accordingly to indicate different time periods.

13. Time vending apparatus according to claim 1 including a totalizer for totalizing the values of inserted coins; and transmission means including a one-way coupling connecting said sensing means and said indicator means with said totalizer so that the same is operated to register the sold time period and thereby the buying power and monetary value of inserted coins.

14. Time vending apparatus according to claim 13 wherein said sensing means includes a lever having a for varying the ratio of said variable transmission.

15. Time vending apparatus according to claim 14 wherein said sensing means is movable along a path in which said second control means in said sensing position is located; and comprising a gear for driving said totalizer, gear means meshing with said gear, and link means settable to different positions for connecting said gear means with said sensing means in different positions for varying the transmission ratio between said sensing means and said totalizer.

16. Time vending apparatus according to claim 15 wherein said sensing means includes a lever having a plurality of attaching means; wherein said gear means includes a lever arm having a plurality of attaching means; and wherein said link means can be connected at the ends thereof to different selected attaching means of said lever and of said lever arm for varying the transmission ratio between the same.

17. Time vending apparatus according to claim 1, said drive means including a spring motor; wherein said transporting means includes a rotary transporting member driven from said motor; including arresting means for arresting said transporting member and adapted to be operated by a coin to release said transporting member for rotation by said spring motor; rotary cam means driven from said spring motor; wherein said sensing means include a sensing lever, spring means for urging said sensing lever into engagement with said cam and toward said second control means; and wherein said indicator means include a pointer connected with said sensing lever for movement in one direction.

18. Time vendnig apparatus according to claim 17 wherein said first control means include a feeler lever actuated by a coin moving with said transporting member to be angularly displaced, a rotary control disk; and gear means connecting said feeler lever with said rotary control disk for turning the same to said accepting position an angle greater than the angle of displacement of said feeler lever; and wherein said second control means includes at least one stop mounted on said control disk adjustably in circumferential direction in accordance with the diameter of a corresponding coin so as to be moved by said control disk to said sensing position, and being adjustably in radial direction to be preset to a position representing a selected time period.

19. Time vending apparatus according to claim 18 wherein said second control means include a plurality of said adjustable stops, each of said stops being independently adjustable in circumferential direction and in radial direction of said rotary control disk.

20. Time vending apparatus according to claim 19 and including holding means for holding each of said stops in said sensing position, and said control disk in the corresponding accepting position during sensing of the respective stop by said sensing means; and including means for turning said control disk with said stops to an inoperative position when said feeler lever is released by said coin, and said control disk is not in one of said accepting positions so that said holding means is inoperative.

References Cited
UNITED STATES PATENTS

| | | | |
|---|---|---|---|
| 2,631,710 | 3/1953 | Hale | 194—72 |
| 2,901,078 | 8/1959 | Hamilton | 194—72 |
| 3,026,983 | 4/1962 | Hamilton | 194—72 |

WALTER SOBIN, *Primary Examiner.*